United States Patent
Yi et al.

(10) Patent No.: US 7,539,137 B2
(45) Date of Patent: May 26, 2009

(54) METHOD FOR TRANSMITTING DATA FROM RLC LAYER IN RADIO COMMUNICATION SYSTEM

(75) Inventors: Seung June Yi, Seoul (KR); Woon Young Yeo, Anyang-shi (KR)

(73) Assignee: LG Electronics Inc., Seoul (KR)

( * ) Notice: Subject to any disclaimer, the term of this patent is extended or adjusted under 35 U.S.C. 154(b) by 340 days.

(21) Appl. No.: 11/314,240

(22) Filed: Dec. 22, 2005

(65) Prior Publication Data
US 2006/0098574 A1 May 11, 2006

Related U.S. Application Data

(63) Continuation of application No. 09/971,932, filed on Oct. 9, 2001, now Pat. No. 7,054,270.

(30) Foreign Application Priority Data

Oct. 7, 2000 (KR) .................. 10-2000-0059017
May 18, 2001 (KR) .................. 10-2001-0027269

(51) Int. Cl.
*G01R 31/08* (2006.01)

(52) U.S. Cl. .................. 370/232; 370/253; 370/469

(58) Field of Classification Search .................. None
See application file for complete search history.

(56) References Cited

U.S. PATENT DOCUMENTS

| 5,764,641 | A | 6/1998 | Lin | 370/412 |
| 6,151,299 | A | 11/2000 | Lyon et al. | 370/229 |
| 6,188,671 | B1 | 2/2001 | Chase et al. | 370/232 |
| 6,301,479 | B1 | 10/2001 | Roobol et al. | 455/436 |
| 6,512,747 | B1 | 1/2003 | Umeuchi et al. | 370/310.1 |

FOREIGN PATENT DOCUMENTS

EP    1 030 484 A2    8/2000

(Continued)

OTHER PUBLICATIONS

3GPP TS 25.322 V4.1.0 (Jun. 2001) Technical Specification; 3rd Generation Partnership Project; Technical Specification Group Access Network; RLC Protocol Specification (Release 4).

(Continued)

*Primary Examiner*—Ricky Ngo
*Assistant Examiner*—Phuongchau B Nguyen
(74) *Attorney, Agent, or Firm*—Ked & Associates, LLP

(57) ABSTRACT

Disclosed is a method for transmitting data from an RLC layer in a radio communication system. The method includes the steps of storing RLC SDUs transferred from an upper layer in a transmission buffer, transmitting RLC PDUs on which the RLC SDUs stored in the transmission buffer are loaded to a receiving side in order, discarding the RLC SDUs stored in the transmission buffer, checking whether a transmission mode indicator is configured, and transmitting discard information about the discarded RLC SDUs to the receiving side entirely or in part in accordance with whether the transmission MRW mode indicator is configured.

20 Claims, 9 Drawing Sheets

U.S. PATENT DOCUMENTS

| | | | |
|---|---|---|---|
| 6,519,223 B1 * | 2/2003 | Wager et al. | 370/216 |
| 6,532,211 B1 | 3/2003 | Rathonyi et al. | 370/230 |
| 6,574,224 B1 * | 6/2003 | Brueckheimer et al. | 370/466 |
| 6,687,248 B2 * | 2/2004 | Jiang | 370/469 |
| 6,816,471 B1 | 11/2004 | Ludwig et al. | 370/331 |
| 7,054,270 B2 * | 5/2006 | Yi et al. | 370/232 |
| 7,269,760 B2 * | 9/2007 | Wu | 370/469 |
| 7,411,979 B2 * | 8/2008 | Jiang | 370/469 |

FOREIGN PATENT DOCUMENTS

| | | |
|---|---|---|
| EP | 1 198 107 A2 | 4/2002 |
| KR | 10-2000-0041332 A | 7/2000 |

OTHER PUBLICATIONS

3GPP TS 25.322 V3.4.0 (Sep. 2000) Technical Specification; 3$^{rd}$ Generation Partnership Project; Technical Specification Group Access Network; RLC Protocol Specification (Release 1999).

3G TS 25.322 V3.1.2 (Jan. 2000) Technical Specification, 3rd Generation Partnership Project; Technical Specification Group Radio Access Network; RLC Protocol Specification (3G TS 25.322 version 3.1.2).

ETSI TS 125 322 V3.1.2 (Jan. 2000) Technical Specification, Universal Mobile Telecommunications System (UMTS); RLC Protocol Specification (3G TS 25.322 version 3.1.2 Release 1999).

Korean Office Action dated May 1, 2003.

* cited by examiner

FIG. 2B
Related Art

| MRW command |
|---|
| Length = 4(0100) |
| $SN\_MRW_1$ = 1(00...0001) |
| $SN\_MRW_2$ = 1(00..0001) |
| $SN\_MRW_3$ = 3(00...0011) |
| $SN\_MRW_4$ = 7(00..0111) |
| $N_{LENGTH}$ = 1(0001) |

FIG. 3

| |
|---|
| Type = MRW1 |
| LENGTH(mandatory) |
| $SN\_MRW_1$ (optional) |
| $SN\_MRW_2$ (optional) |
| ... |
| $SN\_MRW_{LENGTH-1}$ (optional) |
| $SN\_MRW_{LENGTH}$ (mandatory) |
| $N_{LENGTH}$ (mandatory) |

FIG. 4

| |
|---|
| Type = MRW2 |
| LENGTH |
| $SN\_MRW_{LENGTH}$ |
| $N_{LENGTH}$ |

METHOD FOR TRANSMITTING DATA FROM RLC LAYER IN RADIO COMMUNICATION SYSTEM

CROSS-REFERENCE TO RELATED APPLICATIONS

This is a Continuation Application of prior application Ser. No. 09/971,932 filed Oct. 9, 2001 now U.S. Pat. No. 7,054,270. This application claims the benefit of the Korean Application Numbers P2000-59017 filed on Oct. 7, 2000 and P2001-27269 filed on May 18, 2001, which are hereby incorporated by reference.

BACKGROUND OF THE INVENTION

1. Field of the Invention

The present invention relates to a method for transmitting data from an RLC layer in a radio communication system, and more particularly, to a method for carrying out a SDU discard function in a radio communication system having an RLC layer.

2. Background of the Related Art

FIG. 1 illustrates an architectural diagram of a general radio communication system, having an architecture of a radio interface protocol according to a radio access network standard of an European IMT-2000 UMTS (universal mobile telecommunication system).

Referring to FIG. 1, a radio link control (RLC) layer in a radio communication system as a second layer of 3GPP is a protocol layer controlling a data link. Moreover, the RLC layer corresponds to a second layer of an OSI 7-layered model. All entities of the RLC layer are embodied by a radio resource control (RRC) layer as an upper layer. The radio interface protocol between a user equipment and a UTRAN (UMTS terrestrial radio access network) includes a physical layer, a data link layer, and a network layer horizontally. Vertically, the protocol architecture is divided into a control plane for transferring a control signal (signaling), and a user plane, for transmitting data information.

Specifically, as shown in FIG. 1 a RRC layer exists on the control plane as a third layer, a RLC layer and a medium access control (MAC) layer exist as second layers, and a physical layer exists as a first layer. Moreover, in the user plane, RLC and MAC layers exist on the second layer, and the physical layer exists on the first layer.

The physical layer provides the upper layer with an information transfer service using various radio transmission techniques and is connected to the MAC layer on the upper layer via transport channels. Data is transported between the MAC and physical layers through the transport channels. The transport channels are divided into a dedicated transport channel, used exclusively for the user equipment, and a common transport channel, used for the user equipments in common.

The MAC layer provides a re-allotment service of a radio resource and MAC parameters. Such a service demands the re-allotment of the radio resource or the change of the MAC parameters. The MAC layer is connected to the RLC layer through a logical channel and provides various logical channels in accordance with the species of the transmission information. Generally, the control channel is used when information of the control plane is transmitted, while a traffic channel is used for transmitting information of the user plane.

The RLC layer provides the establishment and release of a radio link and performs segmentation and concatenation relating to a RLC service data unit (SDU) coming down from an upper layer of the user plane. The size of the RLC SDU is adjusted to fit a processing capacity in the RLC layer. Header information is then added to the SDU to form a protocol data unit (PDU). The RLC SUD is transferred to the MAC layer. In this case, an RLC buffer for storing RLC SDUs or RLC PDUs coming down from the upper layer exists in the RLC layer.

The RRC layer provides an information broadcast service for broadcasting information to all user equipments located at random areas. Moreover, the RRC layer takes charge of a control plane signal processing for a control signal exchange in the third layer to establish, maintain, and release a radio resource between the user equipment and UTRAN. Specifically, the RRC layer also has functions of establishing, maintaining, and releasing a radio access bearer channel as well as allotment, rearrangement, and release of a radio resource necessary for a radio resource access. In this case, the radio access bearer means a service provided by the second layer for data transfer between the user equipment and UTRAN. Namely, 'establishing one radio access bearer' means that characteristics of a protocol layer and a channel required for providing a specific service are stipulated and that the respective specific parameters and operational methods are established.

The RLC layer will next be described in greater detail. In accordance with the functions carried out by the RLC layer, there exist three modes. These are the transparent mode, the unacknowledged mode, and the acknowledged mode.

When the RLC operates in the transparent mode, no header information is added to the RLC SDU coming down from the upper layer. Generally, segmentation and reassembly are not performed in the transparent mode. Yet, if necessary, when the radio access bearer is established (configured), it is determined whether the segmentation and reassembly functions are used or not.

When the RLC operates in the unacknowledged mode, retransmission is not backed up even if the transmission of RLC PDU fails. Therefore, a receiving side does not demand the retransmission when data is lost or when problems occur during transmission. Instead, the receiving side discards the related data. Services using the unacknowledged mode include a cell broadcast service, a voice service using an IP network (voice over IP service), and the like.

When the RLC operates in the acknowledged mode, the retransmission is backed up when the transmission of a packet fails. Thus, the RLC layer of a transmitting side receives status information from the receiving side used to determine the success of the transmission. The transmitting side RLC layer then retransmits the RLC PDUs demanded for retransmission. In the acknowledged mode, the RLC SDU received by the RLC layer from the upper layer is, if necessary, divided into pre-defined sizes by segmentation/concatenation. The RLC SDU then becomes RLC PDUs, to which header information including sequence numbers are added. The RLC PDUs are stored in a RLC buffer according to the sequence numbers.

The stored RLC PDUs amounting to the exact number demanded by the MAC layer are transferred to the MAC layer, where the transmission is carried out in accordance with the order of the sequence numbers. From the RLC layer of the transmitting side, a firstly-transmitted RLC PDU is transmitted according to the order of the sequence numbers. Therefore, the RLC layer of the receiving side checks the received sequence numbers so as to demand retransmission of transmission-failed data from the transmitting side RLC layer.

When the RLC SDUs (service data units) having come down to the RLC layer in the transmitting side radio communication system fail to be transmitted to the receiving side radio communication system, the transmitting side needs to discard the SDUs in order to prevent a transmission buffer from becoming overloaded.

A function of discarding the SDUs (service data units) is used by the RLC layer, which is embodied in the RRC layer as well.

There are two methods for carrying out the SDU discard function. The first method is a time-based SDU discard method. The time-based SDU discard method uses a timer to carry out the discarding of SDUs. The second SDU discard method depends on limiting the number of transmissions. Thus the first method measures the time during which a SDU stays, while the second method measures how many times a PDU is retransmitted. In this case, the target to be discarded is SDU.

Regarding the time-based SDU discard method, when RLC SDUs come down to the RLC layer from the upper layer of the transmitting side, a discard-timer is driven. The discard-timer counts the time during which each RLC SDU stays in the RLC layer.

Subsequently, if the corresponding RLC SDU fails to be transmitted to the receiving side before the discard-timer expires, or if an ACK (acknowledgment) signal fails to be received from the receiving side even if the corresponding RLC SDU is transmitted to the receiving side, then the receiving side radio communication system discards all of the RLC PDUs including the corresponding SDU.

On the other hand, if an RLC SDU, which is not to be discarded, as well as the RLC SDU to be discarded are both included in the same RLC PDU, the transmitting side would not discard the corresponding RLC PDU.

The second SDU discard method functions by limiting the number of transmissions. In the second method, the RLC layer of the transmitting side counts the number of transmissions of the respective RLC PDUs toward the receiving side. Specifically, a counter VT-DAT, which counts the transmission number of the respective RLC PDUs, is initiated to operate. The counter VT-DAT increases the count value by 1 every time one RLC PDU is transmitted to the receiving side.

The transmission-possible number of a specific RLC PDU is defined as a maximum variable MaxDAT. If the count value of the counter VT-DAT becomes equal to or higher than the maximum variable MaxDAT, SDUs included in the corresponding RLC PDU and all the RLC SDUs having been transmitted before the corresponding RLC PDU are discarded.

FIG. 2A illustrates a related art method of transmitting discard information of RLC SDUs discarded using the time-based RLC SDU discard method to the receiving side.

Referring to FIG. 2A, the RLC layer receives RLC SDU0, RLC SDU1, RLC SDU2, and RLC SDU3 from the upper layer, and transforms them into RLC PDU forms. The RLC PDU forms are successively transmitted to the receiving side. In this case, the RLC SDUs are data units stipulated by the upper layer.

The respective SDUs are loaded on at least one RLC PDU so as to be transmitted to the receiving side. SDU0, SDU1, SDU2, and SDU3 include PDU0/PDU1, PDU1, PDU1/PDU2/PDU3, and PDU3 to PDU7, respectively. The sequence numbers, SN 0 to 7, are given to the PDUs PDU0 to PDU7 in order, respectively. Thus, the sequence-numbered PDU is transmitted toward the receiving side.

After the previously-set time during which SDU0 to SDU3 may stay in the transmitting side expires, PDU0 and PDU1 are transmitted to the receiving side. PDU2 and PDU3, however, are lost during the transmission. Meanwhile, PDU4 to PDU 7 are not yet transmitted to the receiving side from the transmitting side.

As mentioned above, once the previously-set time for SDU0 to SDU3 expires, the transmitting side discards PDU0 to PDU7 corresponding to SDU0 to SDU3 in the internal transmission buffer so as to transfer the corresponding discard information, which is loaded on MRW SUFI (move receiving window super field), to the receiving side.

FIG. 2B illustrates formats and parameters of the MRW SUFI which are transmitted in the scenario illustrated in FIG. 2A.

Referring to FIG. 2B, a parameter LENGTH is constructed with 4 bits and indicates the number of discarded SDUs. Other parameters SN_MRW1 to SN_MRW4 indicate sequence numbers of the PDUs respectively. Each of the parameters SN_MRWi (i=1, 2, 3, and 4) represents the sequence number of the corresponding PDU including the end of each of the discarded SDUs. And, each of the parameters SN_MRWi (i=1, 2, 3, and 4) is constructed with 12 bits.

The 12 bit SN_MRWi indicates a sequence number SN of the first PDU in a PDU or PDUs having the data belonging to the SDU next to the ith discarded SDU. That is, considering every SDU unit, the SN_MRWi (i is a positive integer) is the information commanding that the first PDU having the data of the SDU is to be transmitted right after the discarded SDU.

As shown in FIG. 2B, the parameter LENGTH of the MRW SUFI indicating the number of the discarded SDUs is represented by "0100". Meanwhile, SN_MRW1 is represented by "1," which is a sequence number of PDU1, since an end of SDU0 belongs to PDU1. The SN_MRW2 is represented by "1," which is the sequence number of PDU1 since an end of SDU1 belongs to PDU1. The SN_MRW3 is represented by "3," which is a sequence number of PDU3 since an end of SDU2 belongs to PDU3. Finally, the SN_MRW4 is represented by "7" which is a sequence number of PDU7 since an end of SDU3 belongs to PDU7.

A 4 bit NLENGTH field indicates the data, which defines which SDUs are to be discarded, in the PDU having a sequence number of SN_MRWLENGTH. This indicates which SDUs are discarded when a plurality of SDUs are unable to enter one PDU. For instance, when a value of NLENGTH is set to "0", the PDU having the sequence number of SN_MRWLENGTH shows that there is no data corresponding to the SDU to be discarded. When a value of NLENGTH is set to "2", the data corresponding the second SDU from the front is discarded and the data in the PDU having the sequence number of SN_MRWLENGTH is transmitted/received. In FIG. 2A, NLENGTH is represented by "0001".

The receiving side, which receives the MRW SUFI shown in FIG. 2B as discard information from the transmitting side, discards the PDUs PDU0 to PDU7 corresponding to SDU0 to SDU3 from a receiver buffer inside and moves the receiving window. Subsequently, the receiving side transfers an acknowledged signal to the radio communication system corresponding to the transmitting side. The acknowledged signal commands that MRW_ACK data from the PDU having a sequence number SN of "18" be transmitted to the transmitting side.

The transmitting side, having received the signal from the receiving side, confirms that PDU0 to PDU7 corresponding to the SDU to be discarded have been successfully discarded by the receiving side as well. The transmitting side then starts to transmit the PDU corresponding to the sequence number SN of "8" and so on to the receiving side.

The related art method has many problems and disadvantages. For example, when the timer expires or the previously-set number by the counter is completed, and all of the SDUs related to the transmission are to be discarded, all of the information concerning the discarded SDUs is transmitted to the receiving side. As mentioned above, the sequence number of the corresponding PDU, which indicates the end point of each of the discarded SDUs, comprises 12 bits. The transmission efficiency of the transmitting side is thus greatly reduced if the discarded SDUs are excessive.

Specifically, the transmission of the discard information is designed to make a next receiving window coincide with a next transmission window. Yet, all of the information about the entire discarded SDUs is unnecessarily transmitted to the receiving side. It is enough to inform the receiving side only about the start and end points of a series of the discarded SDUs, of which start and end points are known and which are not transmitted yet, remaining in the internal transmission buffer. Because the excess information is transmitted, a radio resource is wasted.

Moreover, if it is assumed that PDU3 in FIG. 2A has not been transmitted, when the time for which SDU0 to SDU3 are to stay in the transmission buffer expires according to the related art timer-based discard method, the RLC layer of the transmitting side discards SDU0 to SDU3 and transmits such information to the RLC layer. Yet, the information about SDU3, for which transmission has never been attempted, has a zero probability of being received, but is still transmitted to the receiving side. Consequently, another radio resource is wasted.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

An object of the present invention is to provide a system and method of transmitting data from an RLC layer in a radio communication system that substantially obviates one or more problems due to limitations and disadvantages of the related art.

Another object of the present invention is to provide a method for transmitting data from an RLC layer in a radio communication system that enables more efficient use of radio resources.

Another object of the present invention is to provide a method for transmitting data from an RLC layer in a radio communication system that improves a transmission efficiency of the radio communication system.

Another object of the present invention is to provide a method of transmitting data from a Radio Link Control (RLC) layer in a radio communication system, including storing RLC Service Data Units (SDUs) transferred from an upper layer in a transmission buffer, sequentially transmitting RLC Protocol Data Units (PDUs) to a receiving side, the PDUs being formed from the RLC SDUs stored in the transmission buffer, discarding the RLC SDUs stored in the transmission buffer, determining whether a transmission mode indicator is configured, and transmitting one of complete discard information and partial discard information relating to the discarded RLC SDUs to the receiving side in accordance with whether the transmission mode indicator is configured.

Another object of the present invention is to provide a method of transmitting data of a radio link control layer in a radio communication system, including storing upper layer data units transferred from an upper layer in a transmission buffer, forming control layer data units of a radio link control layer on which the upper layer data units are loaded, sequentially transmitting the control layer data units to a receiving side, checking transmission failure of the control layer data units, one of sending discard information regarding all discarded upper layer data units and sending discard information regarding a part of the discarded upper layer data units in accordance with a state of an indicator.

Another object of the present invention is to provide a method of transmitting data from a Radio Link Control (RLC) layer of a communication system, including sequentially transmitting RLC Protocol Data Units (PDUs) corresponding to RLC Service Data Units (SDUs), each PDU having sequence numbers, to a receiving side, discarding corresponding ones of the RLC SDUs when a previously set reference value is exceeded, determining whether the discarded RLC SDUs have been transmitted to the receiving side, renumbering sequence numbers of PDUs associated with RLC SDUs to be transmitted next so as to be initiated from a sequence number of the first PDU having not been transmitted, determining whether a transmission MRW mode indicator has been configured by an upper layer, transmitting discard information about all of the discarded RLC SDUs to the receiving side when the transmission MRW mode indicator is configured, and transmitting the discard information about a portion of the discarded RLC SDUs to the receiving side when the transmission MRW mode indicator has not been configured.

Another object of the present invention is to provide a message for sending discard information of data of a radio link control layer in a radio communication system, including a first field to indicate a the message type, a second field to indicate a data unit of a radio link control layer corresponding to an end of a last discarded data unit of an upper layer of the radio link control layer, and a third field to indicate a status of the data unit of the radio link control layer.

Another object of the present invention is to provide a user equipment (UE) for a radio communication system, including means for sequentially transmitting RLC Protocol Data Units (PDUs) corresponding to RLC Service Data Units (SDUs), each PDU having sequence numbers, to a receiving side UE, means for discarding corresponding ones of the RLC SDUs when a previously set reference value is exceeded, means for determining whether the discarded RLC SDUs have been transmitted to the receiving side UE, means for renumbering sequence numbers of PDUs associated with RLC SDUs to be transmitted next, such that they are initiated from a sequence number of the first PDU having not yet been transmitted, means for transmitting discard information regarding all of the discarded RLC SDUs to the receiving side UE when a transmission MRW mode indicator has been configured, and means for transmitting the discard information regarding only a portion of the discarded RLC SDUs to the receiving side UE when the transmission MRW mode indicator has not been configured.

To achieve at least these objects in whole or in parts, there is provided a method of transmitting data from an RLC layer in a radio communication system including storing RLC SDUs transferred from an upper layer in a transmission buffer, transmitting RLC PDUs on which the RLC SDUs stored in the transmission buffer are loaded to a receiving side in order, discarding the RLC SDUs stored in the transmission buffer, checking whether a transmission mode indicator is configured, and transmitting discard information about the discarded RLC SDUs to the receiving side entirely or in part in accordance with whether the transmission MRW mode indicator is configured.

Preferably, the location information of each of the discarded RLC SDUs comprises a sequence number of each corresponding RLC PDU to which an end of each of the discarded RLC SDUs as well as a sequence number of RLC PDU from which SDU to be transmitted after each of the discarded RLC SDUs starts.

Preferably, the location information of the last discarded RLC SDU is a sequence number of the corresponding RLC PDU to which an end of the last discarded RLC SDU belongs as well as a sequence number of RLC PDU from which RLC SDU to be transmitted after the last discarded RLC SDU begins.

To further achieve at least the above objects in whole or in parts, there is provided a method of transmitting data of a radio link control layer in a radio communication system, including storing data units transferred from an upper layer in a transmission buffer, making data units of a radio link control layer on which the data units of an upper layer are loaded, transmitting data units of a radio link control layer to a receiving side in order, checking a failure of the transmission of the data units, sending discard information about all of the discarded data units of an upper layer or sending discard information about part of the discarded data units of an upper layer according to an indicator.

Preferably, the discard information is sent to the receiving side through a message for moving a receiving window of the receiving side. The message preferably includes a parameter indicating a data unit of a radio link control layer which indicates the end of last discarded data unit of an upper layer, and a parameter indicating the status of the data unit of a radio link control layer.

Preferably, the parameter indicating a data unit of a radio link control layer is the sequence number of the data unit of a radio link control layer to which an end of the last discarded data unit of an upper layer belongs or in which the starting point of a data unit of an upper layer to be transmitted after the discard.

Preferably, the parameter indicating the status of the data unit of a radio link control layer is the number of the data units of an upper layer to be neglected by the receiving side in the data unit of a radio link control layer. Moreover, the message preferably further includes a parameter indicating that the data unit of an upper layer to be discarded in the receiver extends above the configured transmission window in the transmitter. Furthermore, the data unit of the radio link control layer is preferably a RLC PDU and the data unit of an upper layer is preferably a RLC SDU.

When discard information about part of the discarded SDUs is sent the last SDU to be discarded at the receiving side is preferably sent as a part of the discarded SDUs. The discard information includes at least the information required for moving a receiving window of the receiving side.

To further achieve at least the above objects in whole or in parts, there is provided a method including sequentially transmitting RLC PDUs corresponding to RLC SDUs and having sequence numbers to a receiving side, discarding corresponding ones of the RLC SDUs when a reference value set previously to discard each of the RLC SDUs is exceeded, checking whether the discarded RLC SDUs are transmitted to the receiving side, renumbering sequence numbers of PDUs belonging to RLC SDUs to be transmitted next so as to be initiated from a sequence number of the first PDU having not been transmitted, checking whether a transmission mode indicator is configured by an upper layer, transmitting discard information about the discarded RLC SDUs to the receiving side entirely when the transmission MRW mode indicator is configured, and transmitting the discard information about the discarded RLC SDUs to the receiving side in part when the transmission MRW mode indicator fails to be configured.

To further achieve at least the above objects in whole or in parts, there is provided a message for sending discard information of data of a radio link control layer in a radio communication system, including a field indicating the message type, and a field indicating a data unit of a radio link control layer which indicates the end of last discarded data unit of an upper layer of said radio link control layer, and a field indicating the status of said data unit of a radio link control layer.

The message preferably further includes a field indicating that the data unit of an upper layer to be discarded in the receiver extends above the configured transmission window in the transmitter.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 2B is a drawing that illustrates formats and parameters of the MRW SUFI which are transmitted according to FIG. 2A;

FIG. 3 is a drawing that illustrates a table of MRW SUFI according to a preferred embodiment of the present invention;

FIG. 4 is a drawing that illustrates a table of MRW SUFI according to a second embodiment of the present invention;

DETAILED DESCRIPTION OF PREFERRED EMBODIMENTS

Figure 1:
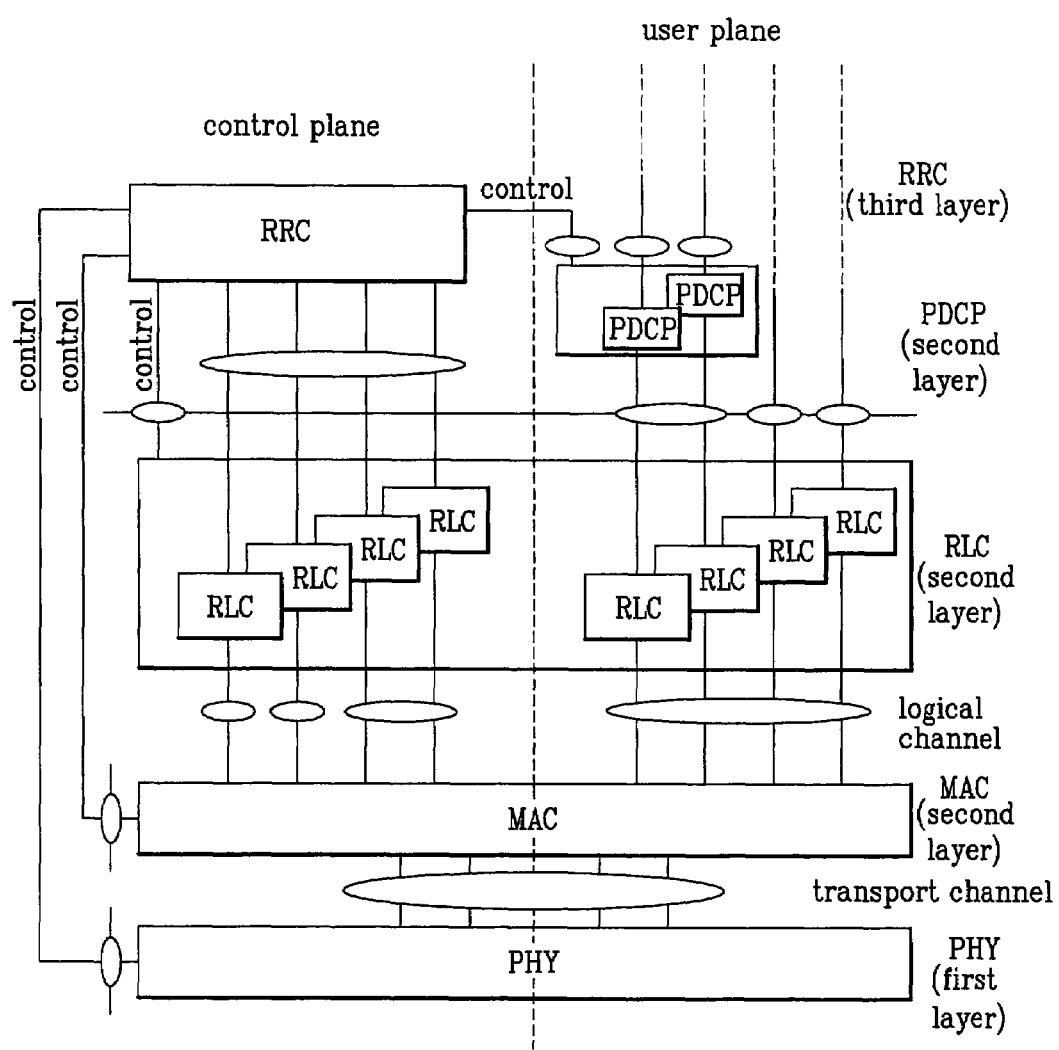
FIG. 1 is a drawing that illustrates an architectural diagram of a related art radio communication system.
Figure 2A:
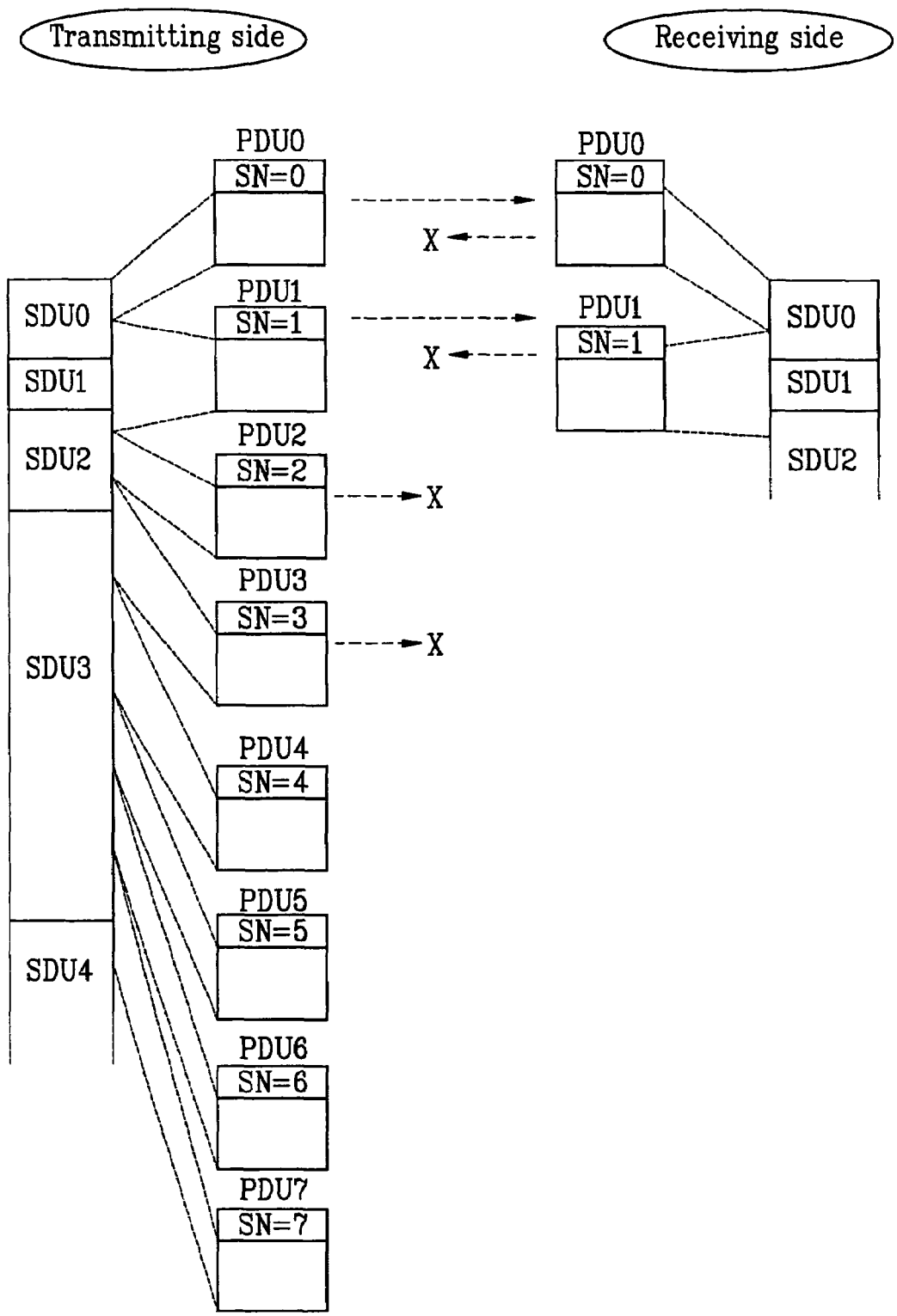
FIG. 2A is a drawing that illustrates a method of transmitting discard information of RLC SDUs discarded by the related art time-based RLC SDU discard method to the receiving side.

Reference will now be made in detail to the preferred embodiments of the present invention, examples of which are illustrated in the accompanying drawings.

In the preferred embodiment of the present invention, a move receiving window (MRW) transmission set indicator for SDU discard information is preferably configured when a RLC layer is produced by an upper layer to establish a radio bearer.

If the MRW mode set indicator is configured, for example, if a sequence number mode of a PDCP layer is set, the PDCP layers of transmission and receiving sides reconcile the sequence numbers of PDCP PDUs, i.e. RLC SDUs. Therefore, the MRW mode set indicator should be configured. Thus, if the configured MRW mode set indicator is established, the RLC layer of the transmitting side transmits all the discard information regarding the discarded SDUs to the corresponding RLC layer of the other radio communication system on the receiving side.

In this case, the discard information includes a sequence number of the PDU belonging to each end of the discarded SDUs. In detail, the discard information includes a field indicating the sequence number of the RLC PDU at an initiating position of the SDU next to each of the discarded SDUs. If two SDUs are overlapped with one PDU and the former SDU is discarded, the sequence number of the PDU indicates an end of the discarded SDU. If a border between two SDUs coincides with that of two PDUs and the former SDU is discarded, the sequence number of the second PDU indicates an end of the discarded SDU.

Meanwhile, if the MRW mode indicator is not configured when the RLC layer is produced, for instance, if a sequence number mode of the PDCP layer is not set, then the transmission side radio communication system transmits the discard information regarding the discarded SDUs to the receiving side either entirely or in part. Of course, it is able to transmit all of the discard information to the receiving side.

In this case, a portion of the discard information, which is required for moving a receiving side receiving window, indicates location information of the last discarded SDU. Specifically, the portion of the discard information indicates a sequence number of the PDU belonging to an end of the last discarded SDU. The discarded information about the discarded SDUs, as mentioned in the above explanation, may be included in the MRW SUFI.

A preferred construction of the MRW SUFI is shown in FIG. 3. Using this construction, the entire discard information of the discarded SDUs can be transmitted to the receiving side.

Referring to FIG. 3, the MRW SUFI preferably includes all of the parameters representing sequence numbers of all PDUs belonging to ends of the discarded SDUs. On the other hand, the MRW SUFI may be constructed in accordance with the table shown in FIG. 4. Using this alternative MRW SUFI, only a portion of the discard information of the discarded SDUs is transmitted to the receiving side. Referring to FIG. 4, the MRW SUFI according to the second embodiment includes one parameter representing a sequence number of the PDU belonging to the last discarded one of the discarded SDUs. Meanwhile, a portion of the discard information of the discarded SDUs may be represented using the entire parameters like FIG. 3.

Referring to FIG. 3, if the MRW mode set indicator is configured for the RLC layer, as mentioned in the above description, the discard information of the entire SDUs discarded in the transmitting side should be transmitted to the receiving side. Therefore, the MRW SUFI preferably includes the parameters LENGTH, SN_MRW1, SN_MRW2, . . . , SN_MRWLENGTH-1, SN_MRWLENGTH, and NLENGTH.

The parameter LENGTH preferably comprises 4 bits, and indicates the number of the discarded SDUs. The parameters SN_MRW1, SN_MRW2, . . . , SN_MRWLENGTH-1, and SN_MRWLENGTH represent sequence numbers of PDUs belonging to ends of the discarded SDUs. Each parameter SN_MRWi preferably comprises 12 bits.

The parameter NLENGTH indicates which SDUs so far correspond sequentially to the last discarded SDU having the PDU belonging to (or representing) an end of the last discarded SDU.

If the number of the discarded SDUs is four, the parameter LENGTH is represented by 4 bits of "0100". Meanwhile, each SN_MRWi (i=1, 2, . . . , LENGTH-1, LENGTH) indicates a sequence number of each PDU belonging to an end of each of the discarded SDUs. For example, if the SDU next to the second discarded SDU starts from the second PDU having a sequence number of "2", the parameter SN_MRW2 is represented by the sequence number of "2". In this case, the parameter for the location information of the discarded SDU is represented by the sequence number of the PDU from which the next SDU starts.

On the other hand, if the MRW mode set indicator is not configured for the RLC layer, as mentioned in the above description, the radio communication system corresponding to the transmitting side just informs the receiving side of the discard information required for moving a window of the receiving side. In this case, the radio communication system corresponding to the transmitting side loads the location information of the last one of the discarded SDUs on the MRW SUFI.

Therefore, FIG. 4 includes the parameter SN_MRWLENGTH, which represents the sequence number of the PDU which belongs to (indicates) an end of the last discarded SDU. FIG. 4 further shows another parameter NLENGTH, which indicates that the last discarded SDU corresponds sequentially to the SDU in the indicated PDU. The parameter NLENGTH represents the number of SDU(s) to be ignored in the indicated PDU.

In FIG. 4, the parameter LENGTH of the MRW SUFI represents the transmitted information of the last discarded SDU. Further, the transmitting side radio communication system checks whether the last discarded SDU exceeds a capacity of the transmission window. In this case, the parameter LENGTH, which is different from that shown in FIG. 3, indicates the check result. Such a field, however, may not be used.

When the SDU, which is discarded last and for which discard information has been transmitted, is located in the transmission window, the radio communication system sets the parameter LENGTH as "0001". When the last transmitted SDU exceeds or is out of the range of the transmission window, however, the field of the parameter LENGTH is set as "0000".

As mentioned in the foregoing description, when the discard information of the transmitting side is transmitted to the receiving side, the transmitting side radio system transmits the information of the discarded SDUs, either entirely or in part, to the receiving side according to whether the transmission MRW mode set indicator is configured for its RLC layer by the RRC layer.

As described above, the Move Receiving Window super-field is used to request the RLC receiver to move its receiving window and optionally to indicate the set of discarded SDUs, as a result of an SDU discard in the RLC transmitter. The format is shown in FIGS. 3 and 4.

Thus, referring to FIGS. 3 and 4, the Length field is preferably 4 bits. It is used to indicate the number of SN_MRWi fields in the super-field of type MRW. The values "0001" through "1111" indicate 1 through 15 SN_MRWi respectively. The value "0000" indicates that one SN_MRWi field is present and that the SDU to be discarded in the receiver extends above the configured Tx window in the transmitter.

The fields SN_MRWi are preferably 12 bits. When a transmission mode MRW is configured, such as a Send MRW, a SN_MRWi is used to indicate the end of each discarded SDU. That is, the number of SN_MRWi fields equals the number of SDUs discarded by that MRW SUFI. When the transmission mode MRW is not configured, however, SN_MRWi is used to indicate the end of the last SDU to be discarded in the receiver. It may also optionally be used to indicate the end of other discarded SDUs. Preferably, SN_MRWi is the sequence number of the PDU that contains the length indicator (LI) of the ith SDU to be discarded in the receiver. However, this is not the case for SN_MRWLENGTH when NLENGTH=0. The order of the SN_MRWi is preferably in the same sequential order as the SDUs to which they refer.

Additionally SN_MRWLENGTH requests the RLC receiver to discard all PDUs with sequence numbers that are less than SN_MRWLENGTH, and to move the receiving window accordingly. In addition, when NLENGTH is greater than 0, the receiver preferably discards the first NLENGTH LIs and the corresponding data octets in the PDU with sequence number SN_MRWLENGTH.

The NLENGTH field is preferably 4 bits, and is preferably used together with SN_MRWLENGTH to indicate the end of the last SDU to be discarded in the receiver. NLENGTH indicates which LI in the PDU with sequence number SN_MRWLENGTH corresponds to the last SDU to be discarded in the receiver. A NLENGTH equal to 0 indicates that the last SDU ended in the PDU with sequence number SN_MRWLENGTH-1 and that the first data octet in the PDU with sequence number SN_MRWLENGTH is the first data octet to be reassembled next.

Figure 5:
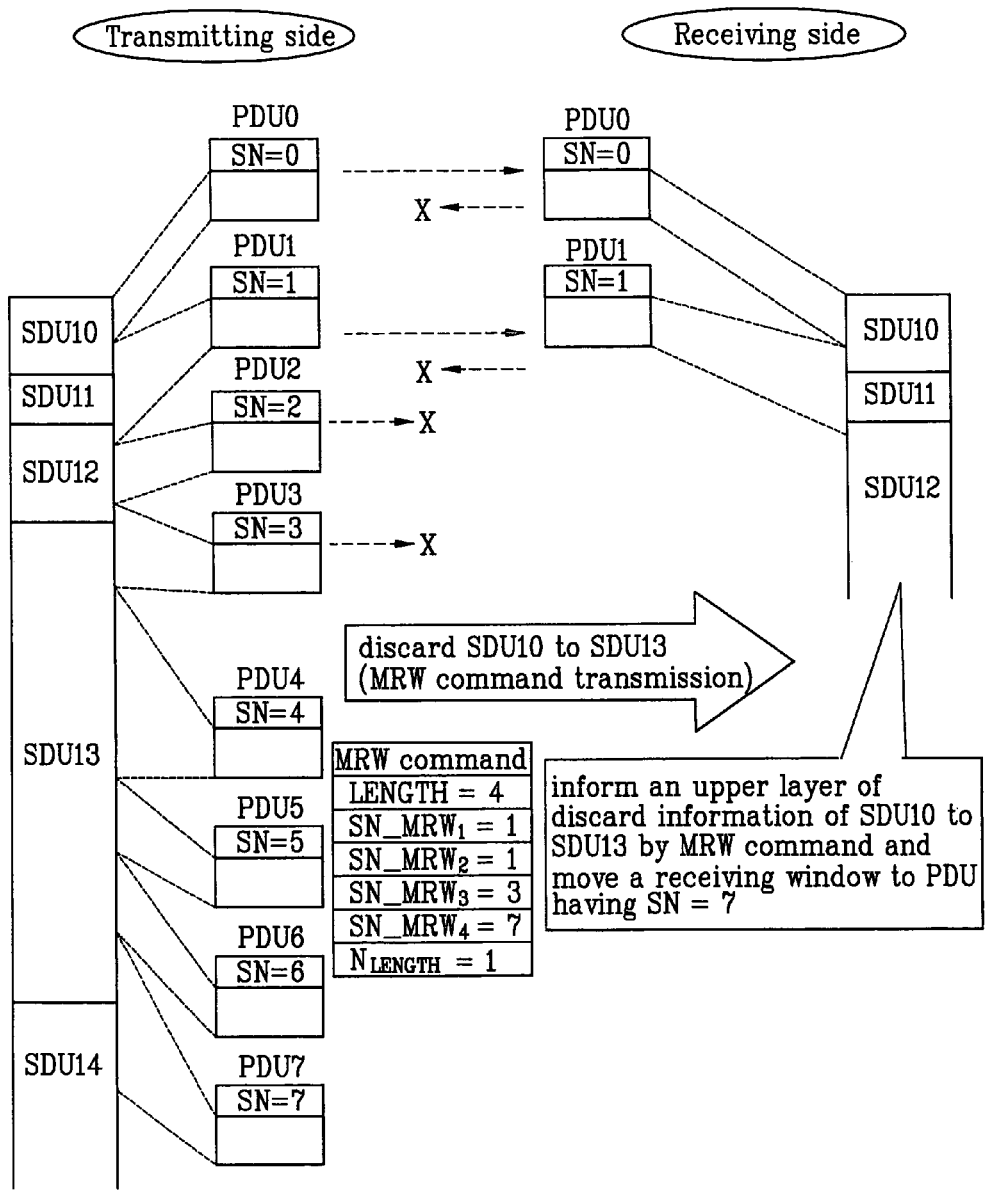
FIG. 5 is a drawing that illustrates carrying out the discard function using the MRW SUFI shown in FIG. 3.

FIG. 5 illustrates a process of carrying out the discard function using a message structure of the MRW SUFI shown in FIG. 3. Referring to FIG. 5, parameters included in the MRW SUFI are explained when the RLC SDUs are discarded.

It is assumed that the RLC SDUs coming down to the RLC layer of the transmitting side are being transmitted to the receiving side. In this case, SDU10 to SDU13 may be discarded if the previously set transmission time in the timer for SDU10 to SDU13 expires or if the prescribed number of transmission is limited.

For instance, if SDU10 to SDU13 are transmitted to the receiving side but are lost during the transmission, or if the transmitting side fails to receive a positive acknowledgment from the receiving side, the transmitting side discards SDU10 to SDU13. The discarded information that is loaded on the MRW SUFI is then transmitted to the receiving side.

The MRW SUFI includes the location information of each of the discarded SDUs. Thus, the MRW SUFI in FIG. 3 includes the location information of the four RLC SDUs corresponding to SDU10 to SDU13. Hence, a value of the parameter LENGTH, as shown in FIG. 5, becomes "4". Additionally, values of the four parameters SN_MRW1 to SN_MRW4 representing the sequence numbers of the PDUs that belong to or indicate ends of the respective discarded SDUs are "1", "1", "3", and "7", respectively.

The last parameter SN_MRW4 is set to "7," which corresponds to PDU7, which is the end of the discarded SDU13. In addition, the last parameter SN_MRW4 directs a start of the following SDU14, and means that PDU7 has a transmission priority when the transmission is reinitiated. SDU13 is the only discarded SDU in PDU7. Hence, a value of the parameter NLENGTH is "1." This commands that the first SDU of the PDU7 transmitted from the receiving side is to be ignored and that the second SDU should be received.

As shown in FIG. 5, the receiving side, having received the MRW SUFI, transmits a response signal MRW_ACK SUFI. The MRW-ACK SUFI corresponds to the MRW SUFI, and is sent to the transmitting side. The receiving side also discards the corresponding RLC SDUs according to the contents included in the MRW SUFI. The receiving side then moves the receiving window to the location of the last discarded SDU. In FIG. 5, the receiving side moves the receiving window to the PDU having the sequence number "7". The receiving side also transfers the discard information of the RLC SDUs discarded by the transmitting side to an upper layer.

Figure 6:
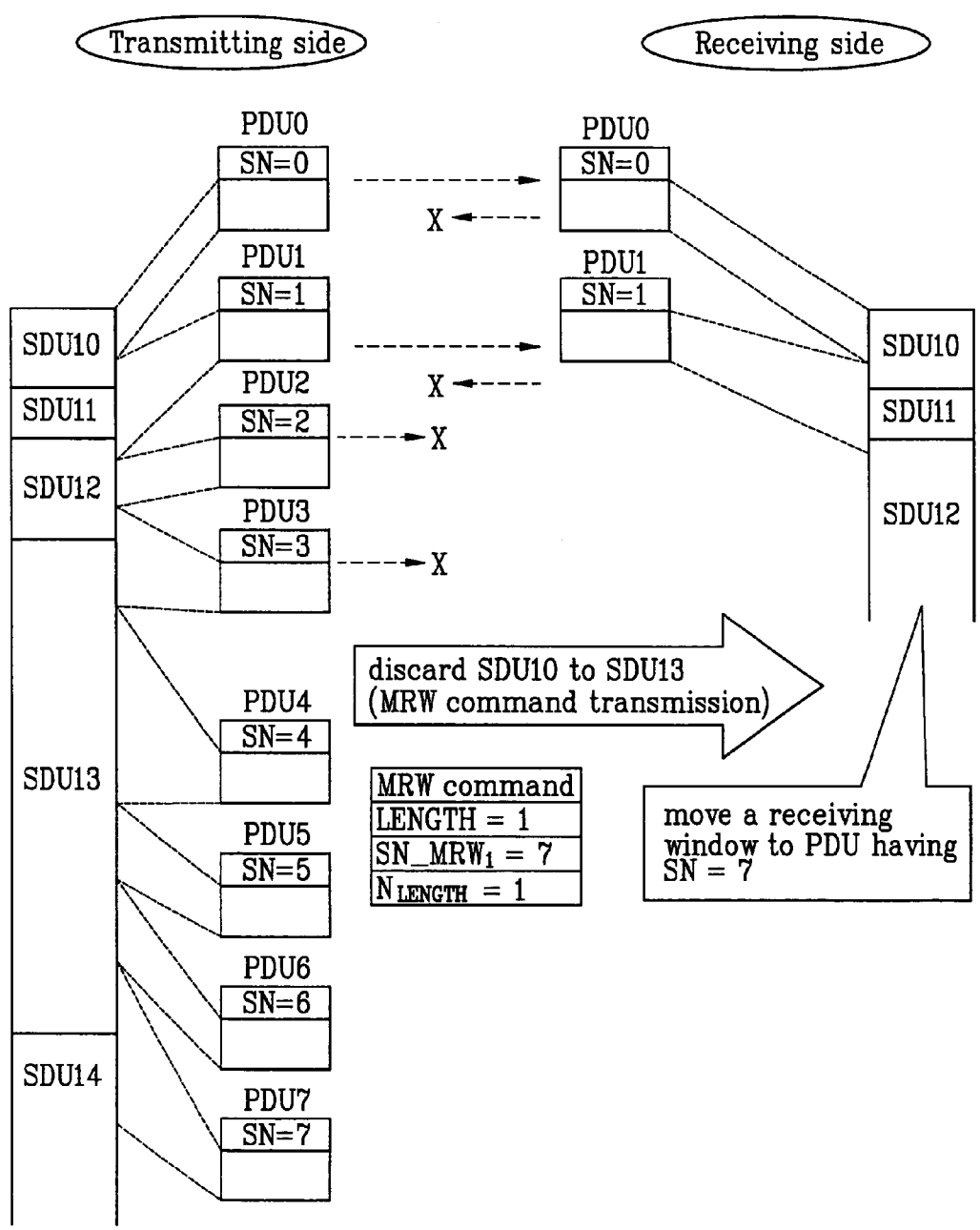
FIG. 6 is a drawing that illustrates carrying out the discard function using the MRW SUFI shown in FIG. 4.

FIG. 6 illustrates a process of carrying out the discard function using the MRW SUFI shown in FIG. 4. The process of FIG. 6 is frequently used when the transmission MRW mode indicator is not configured by the RRC. In FIG. 6, SDU10 to SDU13 are discarded due to either the expiration of the previously-set time of the timer or the limitation of the transmission number.

As previously mentioned, when the transmission MRW mode indicator is not configured, it is unnecessary to transmit the entire discard information for all of the discarded SDUs to the receiving side. As explained in FIG. 4, it is only necessary to inform the receiving side of the location information of the last discarded one of the discarded SDUs.

Therefore, the MRW SUFI includes the location information of the last discarded SDU, in this case SDU13, which fails to exceed the transmission window. Thus, a value of the parameter LENGTH in FIG. 6 becomes "1". Moreover, as shown in FIG. 6, the RLC PDU belonging to or indicating the end of the last discarded SDU13 is PDU7, and SDU 13 is the first one discarded from PDU7. Therefore, a value of the parameter SN_MRW1 is "7", and a value of the parameter NLENGTH becomes The receiving side, having received the MRW SUFI, discards PDUs PDU0 to PDU6. The discarded PDUs are those which have sequence numbers equal to or lower than "7," which is the parameter SN_MRW included in the MRW SUFI. If receiving PDU7, the receiving side discards PDU7 as well. The receiving side then moves the receiving window to PDU7 having the sequence number of "7".

Because the receiving side does not have the transmission MRW mode indicator configured, it does not send the discard information regarding the discarded SDU10 to SDU13 up to the upper layer. In this case, the sequence numbers, if existing, of PDCP PDUs (corresponding to the RLC SDUs) fail to coincide with each other.

An operation for performing the discard function of radio communication systems corresponding to the transmitting and receiving sides is explained in detail as follows by referring to FIG. 7 and FIG. 8.

Figure 7:
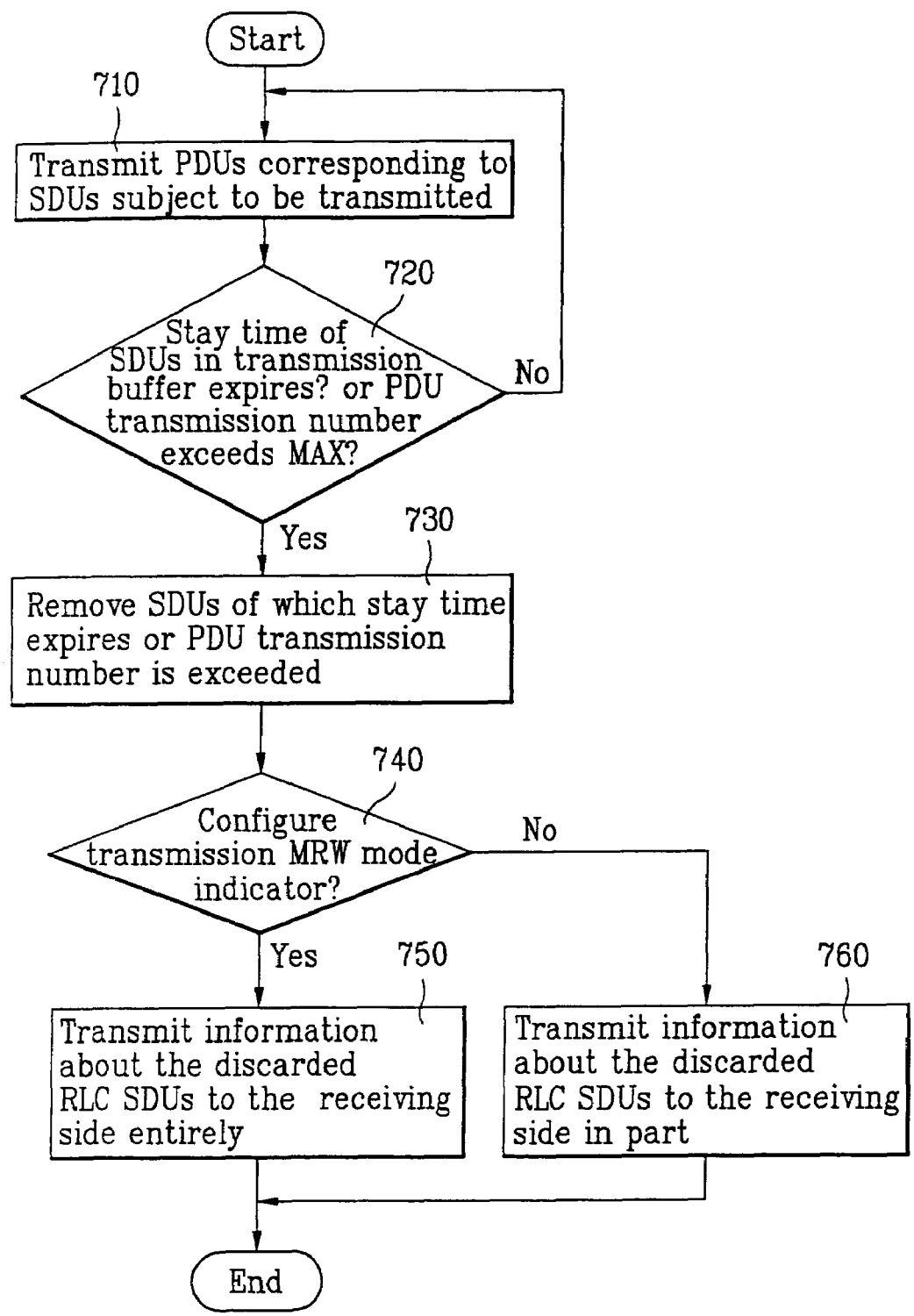
FIG. 7 is a flowchart of a method for operating discard functions of radio communication systems corresponding to transmitting and receiving sides respectively, according to the preferred embodiment.

FIG. 7 is a flowchart illustrating an operation of the discard functions of a radio communication system corresponding to transmitting and receiving sides respectively. FIG. 8 illustrates a process of a discard function for service data units according to a transmission time set in a timer and a limited transmission number in a radio communication system according to a preferred embodiment of the present invention.

Figure 8:
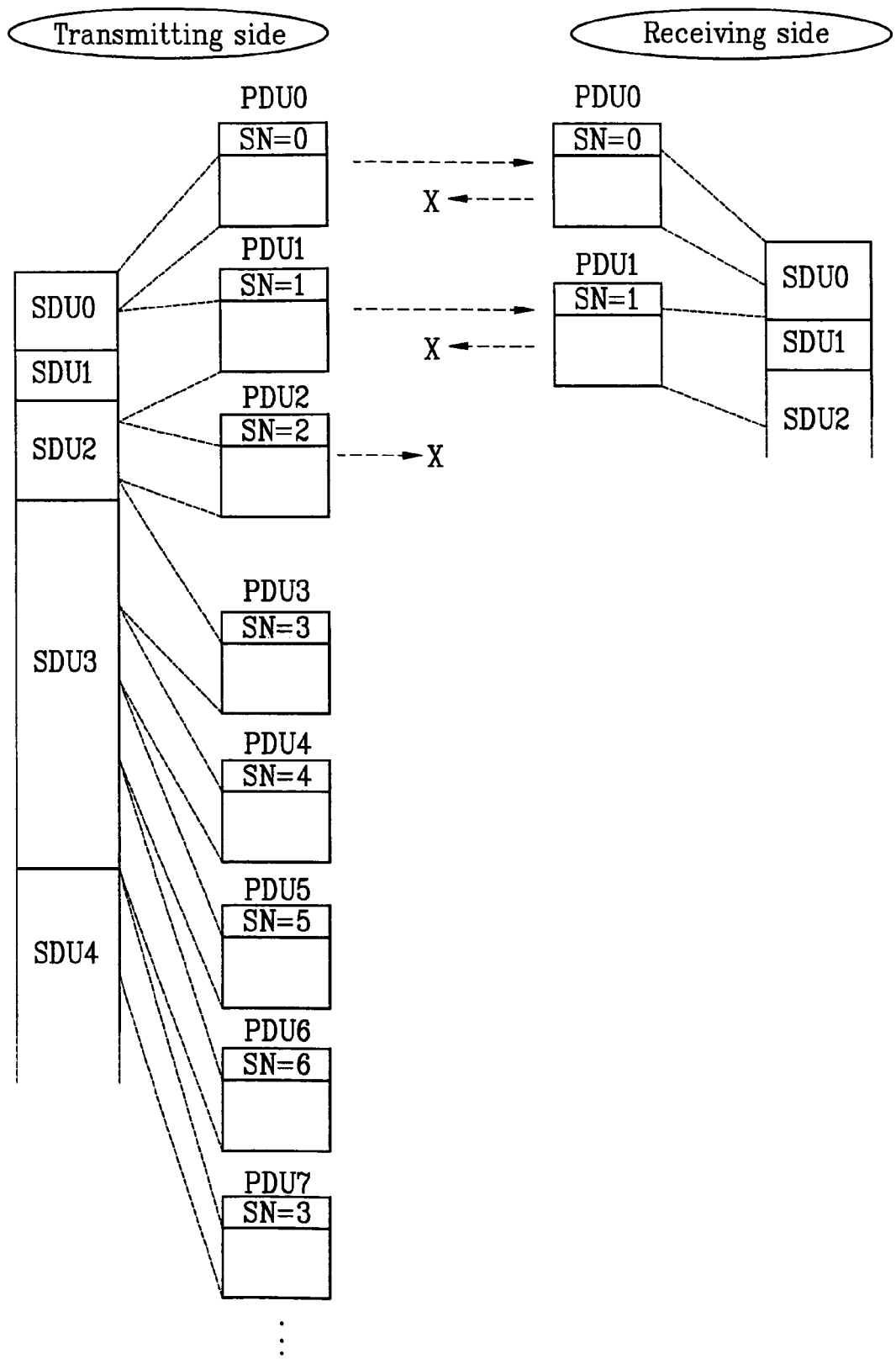
FIG. 8 is a drawing that illustrates carrying out a discard function for service data units according to a stay time limit in a transmission buffer in a radio communication system according to the preferred embodiment of the present invention.

Referring to FIGS. 7 and 8 the time-based service data units RLC SDU0 to RLC SDU4 are successively transmitted as PDU forms, such as PDU0 to PDU7, from a transmitting side of the radio communication system to the receiving side (Step 710).

The respective protocol data units PDU0 to PDU7 corresponding to the respective service data units SDU0 to SDU4 are thus transmitted along with their sequence numbers SN=0 to SN=7 to the receiving side. During transmission, the transmitting side determines whether the previously-set transmission time of the RLC service data units RLC SDU0 to RLC SDU3 has expired or whether the previously-set transmission number has exceeded the limit (Step 720).

If the previously-set transmission time of the RLC service data units RLC SDU0 to RLC SDU4 fails to expire, or if the previously-set transmission number fails to exceed the limit, the transmitting side repeatedly transmits RLC SDU0 to RLC SDU4 to the receiving side. In this case, the transmitting side checks whether the respective RLC SDU0 to RLC SDU4 have been transmitted to the receiving side by confirming the reception of the transmitted PDU.

If the confirmation is not made before the previously-set transmission time of the RLC service data units RLC SDU0 to RLC SDU4 expires or the previously-set transmission number exceeds the limit, the transmitting side determines that transmission of the respective RLC SDU0 to RLC SDU4 has failed.

If RLC SDU0 to SDU4 are transmitted to the receiving side, the transmitting side checks whether the transmission MRW mode indicator is configured for/to the RLC layer (Step 740). If it is determined that the respective RLC SDU0 to RLC SDU4 have not been transmitted to the receiving side, the transmitting side discards the corresponding RLC SDUs (Step 730). If the transmission MRW mode indicator is configured, the transmitting side discards the transmitted RLC SDUs, transmits the entire discard information about the discarded SDUs to the receiving side, and transmits PDU information corresponding to the SDU to be transmitted thereafter.

If, on the other hand, the transmission MRW mode indicator is not configured, the transmitting side transmits a portion of the discard information to the receiving side. In this case, it is a matter of course that the entire discard information for the respective discarded SDUs may be transmitted to the receiving side. The previous discussion of the discard information and the MRW SUFI on which the discard information is loaded is incorporated herein by reference.

If the previously-set transmission time of the respective RLC service data units RLC SDU0 to RLC SDU4 expires or if the previously-set transmission number exceeds the limit, and if at least portions of RLC SDU0 to RLC SDU4 fail to be transmitted to the receiving side, the transmitting side sequentially numbers the sequence numbers of the PDUs corresponding to the SDUs to be transmitted subsequently thereafter from the sequence number of the presently-not-transmitted PDU.

Then, it is determined whether the transmission MRW mode indicator is configured or not. This process is described above, and a detailed explanation is thus omitted.

Meanwhile, if the receiving side requests transmission when the discard information has been entirely or partially transmitted to the receiving side, the transmitting side sequentially transmits the numbered RLC PDUs to the receiving side.

Next, a process of renumbering the sequence numbers of the PDUs is described in accordance with whether an attempt has been made to transmit the respective RLC SDUs.

Referring to FIG. 8, an example of applying the time-based discard method is shown.

First, the RLC layer of the transmitting side of the radio communication system transmits RLC SDU0 to RLC SDU4, which are received from an upper layer, to the receiving side.

In this case, the transmitting side transmits PDUs corresponding to RLC SDU0 to RLC SDU4 to the receiving side. As shown in FIG. 8, RLC SDU0 is transmitted to the receiving side through RLC PDU0 and RLC PDU1. RLC SDU1 is transmitted to the receiving side through RLC PDU1, RLC SDU2 is transmitted to the receiving side through RLC PDU1, RLC PDU2, and RLC PDU3, and RLC SDU3 is transmitted to the receiving side through RLC PDU3 to RLC PDU6. The RLC PDUs have sequence numbers SN=0, SN=1, SN=3, SN=4, SN=5, and SN=6 in order.

Referring to FIG. 8, the transmitting side transmits RLC PDU0 to RLC PDU2, which correspond to RLC SDU0 to RLC SDU2 respectively. RLC PDU0 and RLC PDU1 are received by the receiving side, which transmits acknowledgment signals ACK. In this case, however, the acknowledgment signal is lost and not received by the transmitting side. In fact, the transmitting side is unable to know whether the receiving side failed to receive or whether the transmitting side failed to receive the receiving confirmation signal.

Additionally, RLC PDU2 is lost during the transmission from the transmitting side to the receiving side, and RLC PDU3 to RLC PDU6 are not yet transmitted. In this case, the transmitting side is unable to know that the receiving side failed to receive RLC PDU2, which was lost during the transmission, or that the transmitting side itself failed to receive the receiving confirmation signal. Also, because RLC PDU3 was never transmitted, the transmitting side can confirm that the receiving side failed to receive it.

In this case, if the previously set buffer stay transmission time of RLC SDU0 to RLC SDU3 exceeds the prescribed time limit, the transmitting side of the radio communication system discards the transmitted PDUs (RLC PDU0 to RLC PDU2) and RLC SDU3 corresponding to the RLC PDU3 to RLC PDU6. It also discards RLC SDU0 to RLC SDU2 corresponding to the RLC PDU0 to RLC PDU2, which are stored in the transmission buffer and for which transmission has been attempted.

Meanwhile, the transmission side of the radio communication system checks which SDUs of the discarded RLC SDUs have had a transmission attempt, and determines a sequence number of the first RLC PDU to which data of the discarded RLC SDU belongs. In FIG. 8, the sequence number SN of the first RLC PDU to which data of the discarded RLC SDU belongs and which has never been transmitted is "3". Moreover, the transmitting side, as explained above, transmits the discard information of the discarded RLC SDUs to the receiving side using the MRW SUFI. In this case, the discard information includes PDU information relating to the SDU to be transmitted next time.

The transmitting side renumbers the sequence numbers of PDU(s) corresponding to RLC SDU4, which is to be transmitted later, from the sequence number SN=3 of the never-transmitted and discarded PDU3. Additionally, an initial point of the SDU becomes equal to that of the PDU.

Therefore, as shown in FIG. 8, the sequence number SN of PDU7, which corresponds to RLC SDU4 and is to be transmitted after the RLC SDU3, is changed from "7" to "3." The subsequent process of confirming that the transmission MRW SUFI is configured is the same as that shown in FIG. 7.

Meanwhile, the receiving side of the radio communication system receives the discard information, and discards RLC PDU0 to RLC PDU6 corresponding to RLC SDU0 to RLC SDU3.

Subsequently, the receiving side transmits a demand signal to the transmitting side. The demand signal commands that the RLC PDU having a sequence number of "3" be transmitted from the transmitting side in the first place.

The transmitting side transmits the next RLC SDU4 with the RLC PDU7 having the sequence number SN=3 to the receiving side. Also, sequence numbers of RLC PDUs after the RLC PDU7 are renumbered consecutively from a number right after the sequence number SN=3. Moreover, the RLC PDUs having the renumbered sequence numbers are transmitted from the transmitting side to the receiving side in response to the demand signal.

Figure 9:
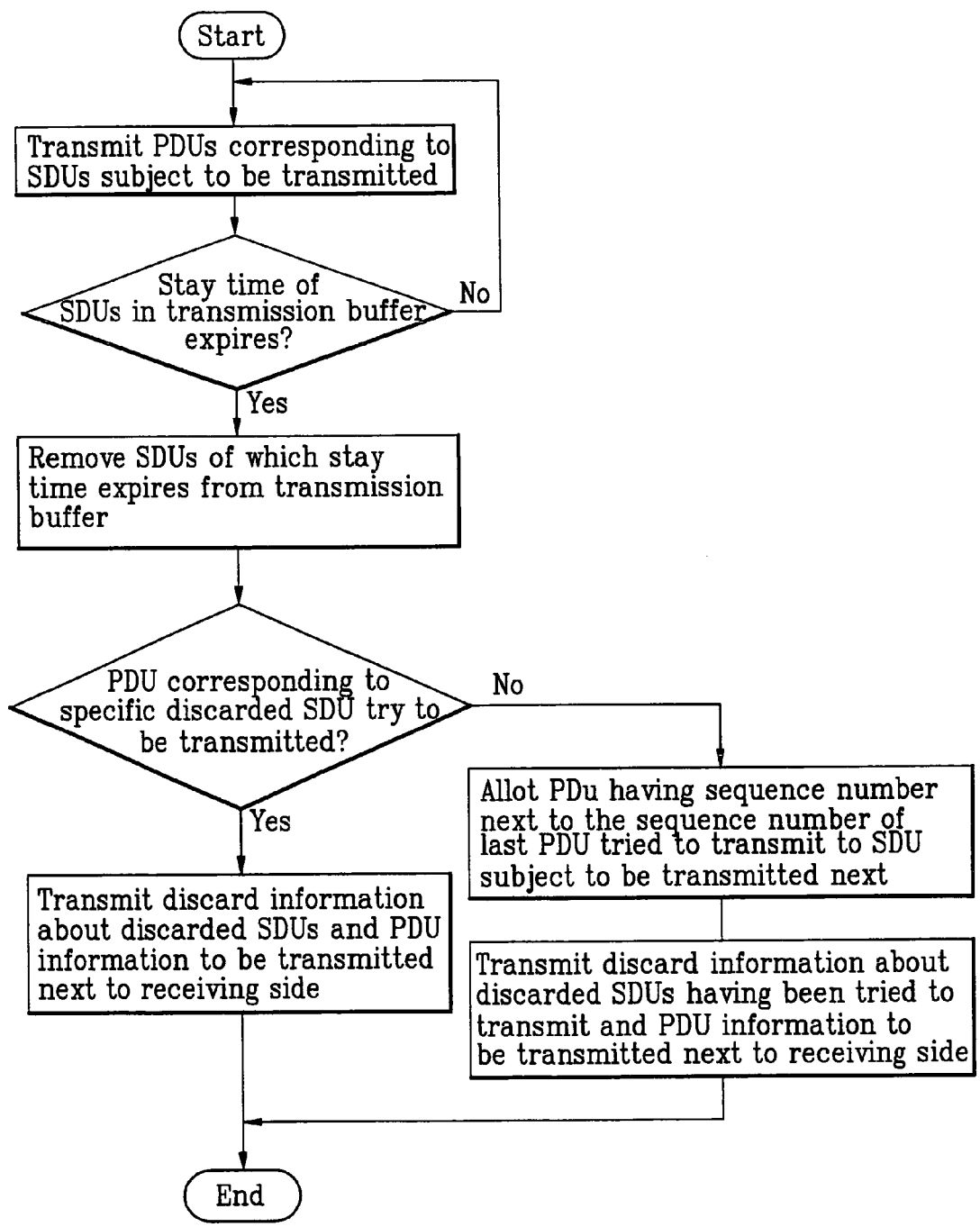
FIG. 9 is a flowchart of a method for carrying out a discard function for service data units (SDUs) according to a stay time limit in a transmission buffer in a radio communication system according to the preferred embodiment of the present invention.

A flowchart for the above processing is shown in FIG. 9.

The discard method of the preferred embodiment has many advantages. For example, the RLC layer of the transmitting side causes PDUs, which correspond to SDUs which are to be transmitted, to be transmitted to the receiving side. In this case, the success/failure of reception is constantly monitored. The time limit is imposed on SDUs staying in the transmission buffer without confirming the success/failure of reception. If this time limit expires, the corresponding SDUs are discarded and the retransmission is terminated. Additionally, information regarding the discarded SDU(s) is transmitted to the receiving side. It is also determined whether a PDU having data of a specific SDU is ever transmitted to the receiving side. Hence, a sequence number of the PDU corresponding to the SDU for which transmission has never been attempted is used for a sequence number of another PDU corresponding to new SDU.

Moreover, the receiving side has no information about the SDU, whereby the discard information is not transmitted either. Yet, according to the preferred embodiment, it is unable to do so when sequence numbers are used in the PDCP layer. Therefore, the preferred embodiment is applicable when the transmission MRW mode indicator is not configured.

In the transmitting side of the radio communication system according to the preferred embodiment, the discard information about the RLC SDUs discarded in the RLC layer is transmitted entirely or partially to the RLC layer of the receiving side variably in accordance with the configuration of the transmission MRW mode indicator. Therefore, the SDU discard function of the preferred embodiment can be carried out with only a control signal. Thus, less information is processed and the load of the transmitting side can be reduced.

Moreover, according to the preferred embodiment, the sequence numbers of the RLC PDUs are renumbered in accordance with success/failure of the transmission of the RLC PDUs corresponding to the very RLC SDUs. When the transmitting side sends the discard information to the receiving side, bit amounts used for informing the discard information about the discarded service data units are used in part. Specifically, only the required discard information is transmitted to the receiving side, thereby reducing the amount of signals required for the transmission. Therefore, a limited radio resource is used efficiently.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of transmitting data in a radio communication system, comprising the steps of:
   transforming service data units (SDUs), received from an upper layer into protocol data units (PDUs);
   discarding at least one service data unit (SDU); and
   transmitting discard information of the discarded at least one service data unit to a receiving side, wherein the discard information includes an entire or a part of information about the discarded at least one service data unit (SDU) in accordance with whether a transmission mode indicator is configured,
   wherein, when the transmission mode indicator is not configured, the part of information about the discarded at least one service data unit indicates the end of a last discarded service data unit.

2. The method of claim 1, wherein the part of information about the discarded at least one service data unit corresponds to a moving position information of a receiving window of the receiving side.

3. The method of claim 1, further comprising moving the receiving window according to the part of information about the discarded at least one service data unit at the receiving side.

4. The method of claim 1, wherein the at least one service data unit corresponds to at least one protocol data unit (PDU) stored in a buffer.

5. The method of claim 4, wherein the at least one service data unit is discarded if a condition is satisfied.

6. The method of claim 5, wherein the condition is satisfied when the at least one service data unit fails to be transmitted to the receiving side until a predetermined period of time is elapsed after receiving the at least one service data unit from the upper layer.

7. The method of claim 5, wherein the condlition is satisfied when an acknowledge (ACK) signal fails to be received from the receiving side even though the at least one protocol data unit is transmitted a predetermined number of times.

8. The method of claim 1, wherein the discard information of the service data unit is loaded to a window moving indicator to be transmitted to the receiving side.

9. The method of claim 8, wherein the window moving indicator is a receiving window moving super field (MRW SUFI).

10. The method of claim 9, wherein the receiving window moving super field comprises a LENGTH field indicating whether or not a last transmitted service data unit of the discarded at least one service data unit exceeds a range of the transmission window, a $SN\_MRW_{LENGTH}$ field indicating a sequence number of a last protocol data unit including the last transmitted service data unit, and a $N_{LENGTH}$ field indicating a specific order of the last transmitted service data unit in the last protocol data unit having the sequence number.

11. The method of claim 10, wherein the LENGTH field is set as "0000" when the last transmitted service data unit of the discarded at least one service data unit exceeds a range of the transmission window.

12. The method of claim 1, wherein, when the transmission mode indicator is configured, the information about each discarded service data unit indicates the end of each discarded service data unit.

13. The method of claim 12, wherein the information about each discarded service data unit is a sequence number of a protocol data unit to which the end of each discarded service data unit belongs.

14. The method of claim 1, wherein the part of information is a sequence number of a protocol data unit to which the end of the last discarded service data unit belongs.

15. A radio transmitter, comprising:

means for receiving service data units from an upper layer;

means for transforming the service data units into protocol data unit;

means for transmitting the protocol data units to the receiving side;

a buffer storing the protocol data units;

means for discarding at least one service data unit corresponding to at least one protocol data unit stored in the buffer; and means for transmitting discard information including an entire or a part of information about the discarded at least one service data unit in accordance with whether a transmission mode indicator is configured, wherein, when the transmission mode indicator is not configured, the part of information about the discarded at least one service data unit indicates the end of a last discarded service data unit.

16. The radio transmitter of claim 15, wherein the discard information is loaded to a window moving indicator to be transmitted toward the receiving side.

17. The radio transmitter of claim 16, wherein the window moving indicator is a receiving window moving super field.

18. The radio transmitter of claim 15, wherein, when the transmission mode indicator is configured, the information about each discarded service data unit indicates the end of each discarded service data unit.

19. The radio transmitter of claim 18, wherein the information about each discarded service data unit is a sequence number of a protocol data unit to which the end of each discarded service data unit belongs.

20. The radio transmitter of claim 15, wherein the part of information is a sequence number of a protocol data unit to which the end of the last discarded service data unit belongs.

* * * * *